Oct. 11, 1960 J. G. CAERO 2,955,680
DISK BRAKE

Filed Sept. 6, 1956 2 Sheets-Sheet 1

INVENTOR.
JOSE G. CAERO
BY
ATTORNEY

Oct. 11, 1960

J. G. CAERO 2,955,680

DISK BRAKE

Filed Sept. 6, 1956

INVENTOR.
JOSE G. CAERO.
BY
Eugene L. Turlock
ATTORNEY

United States Patent Office 2,955,680
Patented Oct. 11, 1960

2,955,680

DISK BRAKE

Jose G. Caero, South Bend, Ind.
(2844 State St., San Diego, Calif.)

Filed Sept. 6, 1956, Ser. No. 608,323

18 Claims. (Cl. 188—70)

This invention relates to improvements in disk brakes, and in particular to disk brakes of the servo type.

The primary object of the invention is to provide a disk brake having improved performance characteristics requiring minimum initial force or exertion to actuate it and which requires only a comparatively short travel of the brake pedal to effect its operation at all times and regardless of the amount of wear which the main or disk brake linings experience.

A further object is to provide a disk brake which produces a good braking action upon the application of a low initial force and which works equally well in both directions of wheel rotation.

A further object is to provide a disk brake which is of simple and compact construction and which possesses no tendency to self-actuation or self-locking.

A further object is to provide a disk brake having a novel construction of actuating means, including a brake band effective upon actuation thereof to produce a differential of rotation between two rotating parts so as to initiate camming action between said parts for applying a disk brake lining carried by one of said rotating parts against a braking surface.

Other objects will be apparent from the following specification.

Figure 1:
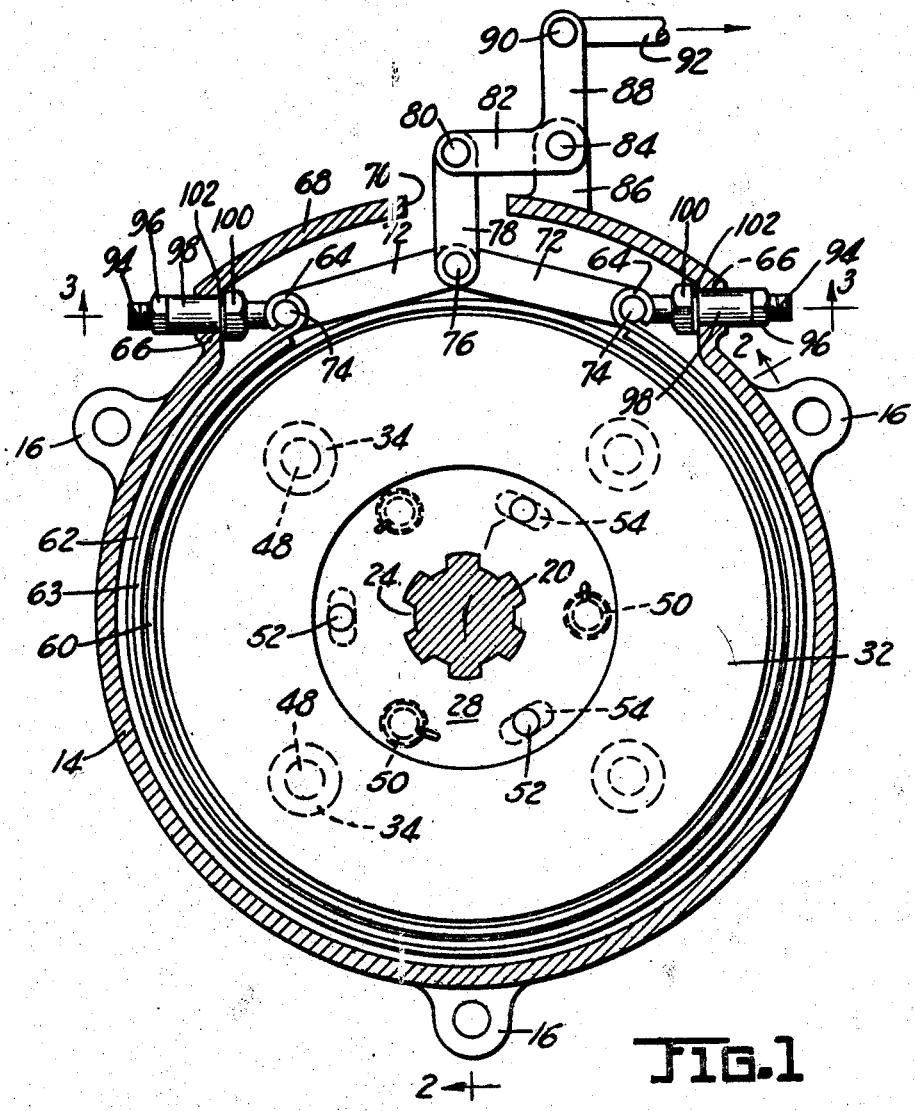
Fig. 1 is a sectional view of the brake taken on line 1—1 of Fig. 2.
Figure 2:
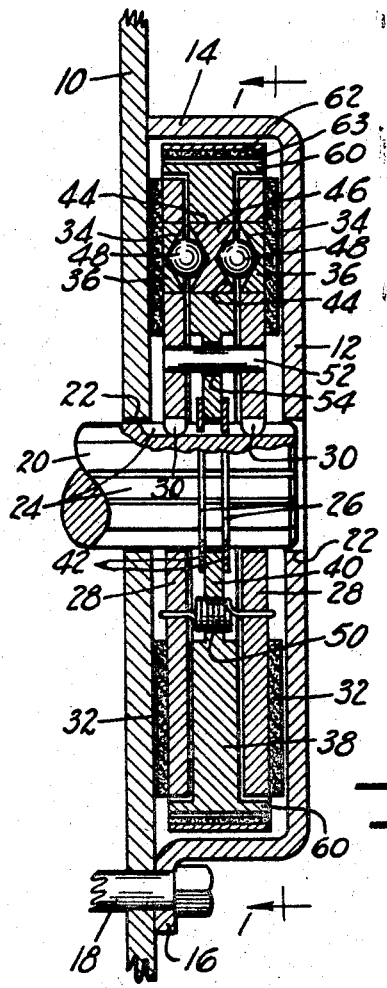
Fig. 2 is a sectional view of the brake taken on line 2—2 of Fig. 1.
Figure 3:
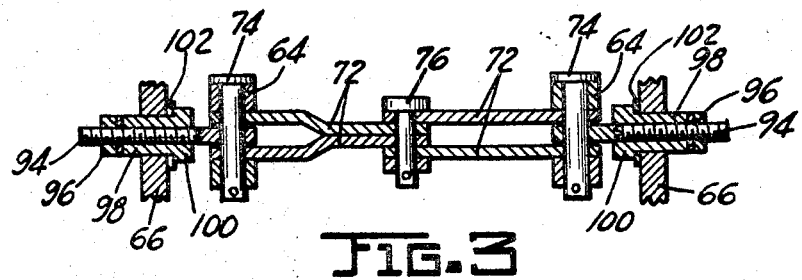
Fig. 3 is a sectional view of the brake actuating means taken on line 3—3 of Fig. 1.

Referring to the drawings, and particularly to Figs. 1 to 3 which illustrate one embodiment of the invention, the numeral 10 designates a backing plate or friction plate which is provided with a flat friction surface. A cover plate 12 is connected to the backing plate 10 and provides a second flat friction surface. As shown, plate 12 is preferably of substantially cup-shape as defined by a cylindrical portion 14. Plates 10 and 12 are fixedly connected and, in the form shown, flanges 16 project from part 14 in the plane of the open end of the cylindrical wall at spaced points, and are apertured to receive securing means, such as bolts 18, which pass also through apertures in the backing plate 10. Bolts 18 serve to anchor both the backing plate and the cover plate in fixed relation to the chassis of a vehicle or the frame of a machine having rotating parts which the brake is adapted to retard upon actuation. The shaft or other rotating member to be braked is designated by the numeral 20 and extends freely through central apertures 22 in the plates 10 and 12, said apertures 22 being axially aligned with each other and shaft 20. The shaft 20 is provided with splines or grooves 24 extending longitudinally thereof and with a pair of circumferential grooves 26 in the construction illustrated in Figs. 1 to 3.

A pair of rotary disk members or plates 28 are arranged in spaced parallel relation between the plates 10 and 12 and are keyed or splined and shiftable in the spline grooves 24 of the shaft 20, as by members 30, so as to accommodate movement of the members 28 lengthwise of the shaft 20. Each of the members 28 carries a brake lining or friction material 32 at its outer face so that said linings are engageable respectively with the members 10 and 12 upon separation of members 28. The members 28 are of a diameter substantially less than the inner diameter of the cylindrical flange 14 of the cover plate 12, as best seen in Fig. 2, and the brake linings 32 preferably have an outer diameter substantially equal to the outer diameter of the members 28 and an inner diameter substantially greater than the diameter of the shaft 20. Each of the members 28 has a plurality of substantially equispaced equiangularly related similar conical or wedging recesses 34 in its inner surface, that is, in the surface facing the opposite member 28. As here shown, the recesses 34 are formed in hardened inserts 36 fixed in openings in the plate 28, but the recesses may be formed in the members themselves. The recesses 34 of opposite members 28 preferably are axially aligned with one another. In the form shown in Fig. 1 four such recesses are provided, but any other number of recesses found suitable may be provided.

A central disk member 38, preferably having a reduced thickness central web portion 40, is interposed between members 28. The central web 40 has a central aperture of a diameter greater than the diameter of shaft 20 and is held in substantially fixed position lengthwise of the shaft 20 by snap rings 42 or other retainers seated in the shaft grooves 26 and bearing against the opposite faces of web 40. The parts are so related that the center member 38 is normally free to rotate with the members 28 and may have a slight sliding action between rings 42. The central member 38 has recesses 44 at opposite faces thereof confronting and normally axially aligned with recesses 34 in the members 28. The recesses 44 are preferably shallow conical or wedging recesses similar to the recesses 34 and maye be formed in the member 38 or in hardened inserts 46 mounted in apertures in the members 38. A roller or sphere 48 is mounted in each confronting pair of recesses 34, 44 and is of such diameter that, when said recesses are centered or registered relative to each other, the members 28 can be drawn inwardly toward each other by coil springs 50 connecting the same so as to space the brake linings 32 from the respective braking surfaces 10 and 12 which they confront. The rollers 48 are of such diameter and the depth of the recesses 34 and 44 is such that a slight angular displacement of the member 38 relative to the two members 28 will spread the members 28 and force the friction shoes 32 secured thereto against the surfaces 10 and 12 to effect friction braking action.

A plurality of pins 52 interconnect and are slidably received in apertures in the members 28 to hold the members 28 against relative rotation. Elongated arcuate slots 54 are formed in the web 40 of the intermediate member 38 and are curved concentric with the shaft 20 so as to accommodate relative angular displacement of the member 38 relative to the members 28 to thereby accommodate the disalignment of the recesses 34, 44 required to energize or set the brakes.

The recesses 34 and 44 are shaped to provide a self-energizing action. The term "self-energizing" is used in the sense that when initial force is exerted, a force multiplying action results due to the angle or degree of taper of the surfaces 34 and 44. In the preferred form the angle or taper of the recesses 34, 44 is in the order of from 15 to 35 degrees from the surface which each recess interrupts, i.e. the plane of rotation, but this range is illustrative and is not intended to be limiting.

In addition to accommodating relative rotation of the parts 28 and 38, the pins 52 serve as a means to center the member 38 relative to shaft 20 so that it is free to rotate independently of said shaft. The retainers 42 are preferably so related to the web 40 of the central member 38 as to permit slight axial movement of the member 38 so that it is free to assume a position accurately centered between the two members 28 but its movement is limited so that the disk assembly 28, 38 cannot move longitudinally sufficiently to cause one of the brake shoes to engage the adjacent braking surface at a time when the brake is unactuated.

The member 38 is provided with a peripheral outer cylindrical flange 60 of a width narrower than the spacing between the friction surfaces of the plates 10 and 12. The inner diameter of flange 60 is greater than the outer diameter of the members 28. A curved band 62, preferably formed of metal and having looped ends 64 spaced apart as seen in Fig. 1, encircles the flange 60 with clearance. A friction lining or brake band 63 lines the member 62 and normally fits around the cylindrical member 60 with clearance. The cylindrical member 14 of the part 12 is interrupted by an outward offset including a pair of substantially parallel outwardly directed portions 66 and a curved portion 68 between the parts 66. Part 68 preferably has an aperture 70 therein.

Suitable brake-actuating means are provided for drawing together the looped ends 64 of the brake band 63 to apply the brake lining 63 against the cylindrical flange 64 to retard the rotation of the member 38. The brake actuating means may be of any type, and may include mechanical, hydraulic, electrical or compressed air actuated components. In the form shown in Fig. 1, the actuating means includes toggle links 72 connected by pivot pins 74 to the looped ends 64 of the brake band 62 and pivotally interconnected at their adjacent ends by pivot pin 76. A link 78 is connected to pin 76 and passes through the opening 70 for connection at pivot pin 80 with means to pull the link 78 outwardly. In the form shown, link 78 is connected to one arm 82 of a bellcrank lever which is pivoted at its center at 84 to lugs or projections 86 carried by the part 68. The other arm 88 of the bellcrank is pivoted at 90 to an actuating lever, link, rod or other member 92 extending to a brake actuating member (not shown) operated by a brake pedal (not shown) in the manner well understood in the art. Member 92 is shiftable endwise upon operation of such brake pedal and actuating member for the purpose of swinging the bellcrank 82, 88 and pulling upon the link 78 to pivot the toggle members 72 and draw the looped ends 64 of the brake band 62 together and thereby apply the brake band 63 against the flange 60.

The actuating means is preferably provided with means to accommodate adjustment of the brake band 62 to take up wear. Thus each pin 74 is adjustably supported with relation to adjacent wall 66 by a shank 94 which is externally screw-threaded and which mounts thereon a lock nut 96. A sleeve 98 is internally screw-threaded upon the shank 94 and has an enlarged head 100 at its inner end. The head 100 may be of hexagonal or non-circular form to accommodate rotation thereof for adjustment lengthwise of the shank. The part 66 has an aperture therein accommodating endwise movement of the sleeve 98 relative thereto. A spring washer 102 is interposed between the part 66 and the head 100.

Upon actuation of the brake-operating means to pull outwardly upon the link 78, the toggle 72 will be pulled to draw the pins 74 and the ends of brake band 62 toward each other. Upon engagement of the disk lining 63 with the cylindrical flange 60, the brake band 62 will tend to rotate with the centering member 38. This causes one of the shank 94 to move outwardly in the opening in the member 66 to a fixed position with the shoulder 100 and the spring 102 abutting against the member 66. Thereupon the outward pull upon the toggle links 72 is transmitted to the opposite pin 74 which is free to move to brake applying position because of the slide fit of the sleeve 98 in the opening of the member 66. Consequently, it is apparent that the operation of the member 92 will energize the brake band 62 regardless of the direction of rotation of the shaft 20 and associated rotating parts, and that the actuating mechanism automatically adapts or adjusts itself to compensate for the direction of rotation of the shaft.

When the brake lining 63 engages the cylindrical brake shoe 60 on the centering disk member 38 with sufficient force to retard the rotation of the centering disk member 63 relative to the members 28, a relative angular displacement or differential action occurs between the member 38 and the members 28 with resultant disalignment of the recesses 34 and 44. The disalignment of these recesses causes the rollers or spheres 48 in those recesses to engage the shallower parts of the recesses and cam the members 28 in an outward axial movement upon the shaft 20 in directions to cause the friction members or brake linings 32 to engage the friction surfaces 10 and 12 and thus apply the brakes. The rollers or spheres 48 also serve as means tending to realign the recesses 34 and 44 when the brake actuating force is released, that is, when the brake band 62, 63 is moved out of engagement with the cylindrical drum flange 60. These actions require careful selection of the angle of taper of the members 34 and 44 to avoid wedging or locking and to insure proper functioning of the brake.

It is important that the operation of the two brake disk members 28 shall be substantially equal and simultaneous, and it will be evident that the provision of two sets of rollers or spheres 48 will accomplish that result since the members 28 are keyed to the shaft 20 and are pinned together by the pin 52 to prevent relative rotation thereof with respect to the shaft and with respect to each other. The angular displacement of the members 28 with respect to the member 38 is limited by the pins 52, and any rotational difference between the member 38 and one of the plates 28 will be duplicated with respect to the other plate 28. The centering disk member 38, being held against substantial movement in an axial direction by the retainers 42, insures that the members 28 will be centered normally when drawn inwardly toward each other by springs 50. Likewise, since the rollers 48 cam against the centering member 38 when the brakes are actuated, the friction members 32 are applied against the members 10 and 12 substantially equally upon operation of the brake-actuating means.

One of the important considerations of this device is the fact that the operating linkage permits operation of the device with a relatively small pedal travel, that is, a relatively small increment of endwise movement of the rod 92 and a relatively small amount of travel of the toggle links 72 produced by the movement of the member 92. This factor, coupled with the novel means of adjusting for wear of the brake linkings 63 and the arrangement permitting either of pins 74 to be the anchor point for brake band 62 depending upon the direction of rotation of the shaft 20, are important considerations in this embodiment of the invention. Of equal importance is the fact that the self-energizing action resulting from the camming action of rollers 48 in recesses 34, 44 produces effective brake application regardless of the extent of wear of the friction members 32.

Figure 4:
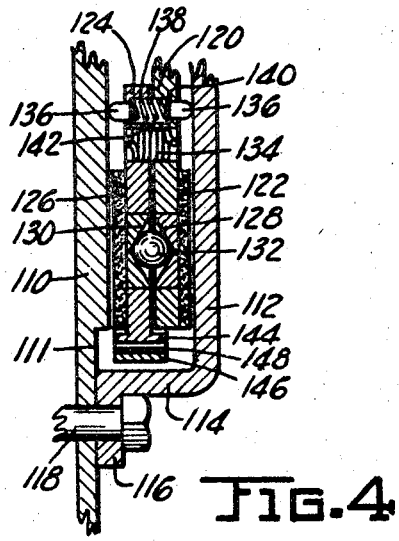
Fig. 4 is a sectional view similar to Fig. 2 and illustrating a modified embodiment of the invention.

In the construction illustrated in Fig. 4, the friction surfaces 110 and 112 are opposed and parallel with the member 112 preferably being flanged cylindrically with an offset (not shown) comparable to the offset 66, 68 shown in Fig. 1, for the purpose of receiving the brake actuating mechanism, as illustrated in Fig. 1. Ears 116 are preferably provided on flange 114 and are apertured to receive securing bolts 118 passing through apertures in the plate 110 to anchor the part 112 in fixed relation to the part 110 and to the chassis of a vehicle or the frame of a machine. One brake disk 120 is splined to a shaft (not shown) arranged concentrically of the cylindrical member 114 in the manner illustrated in Fig. 2. Disk 120 carries a brake lining or friction material 122 adapted to be pressed into frictional face engagement with the member 112. A second disk 124 encircles the shaft with clearance and carries a brake lining or friction material 126 adapted to be applied against the friction surface 110.

A plurality of spaced recesses 128 are formed in the inner face of the member 120 and a plurality of spaced recesses 130 are formed in the inner face of the member 124, the same preferably being shallow tapered or conical recesses and receive therein spherical members or rollers 132. When the deep parts of the recesses 128 and 130 register, the rollers 132 seat therein to permit the disks 120, 124 to be drawn together to the position shown in Fig. 4 by the springs 134 connecting the same and passing through registering apertures therein, said apertures being elongated or oval in shape in a circumferential direction to accommodate slight relative angular displacement or relative rotation of the parts 120 and 124. Upon such relative rotation of the parts displacing the members 128 and 130 from exact register, the rollers 132 come into play to cam the disk members 120 and 124 away from each other and to press their respective friction members 122 and 126 into braking engagement with the members 110 and 112.

If desired, means may be provided to center the members 120 and 124 between the surfaces 110 and 112 during normal operation. One such means is illustrated in Fig. 4 and constitutes anti-friction plungers 136 slidable in bores 138 in the plates 120 and 124. The bores 138 are preferably elongated in circumferential direction, and stepped. The anti-friction members 136 preferably have flanges 140 at their inner ends adapted to seat against shoulders in the stepped bore toward which they are pressed by coil spring 142 interposed therebetween. The reduced dimension portion of each opening 138 is at the outer side thereof so that the disk members 120 and 124 may move outwardly from the position shown in Fig. 4 upon separation of said members by the operation of the rollers 132 in the cam recesses 128 and 130, as previously described.

In this construction the disk 124, which is free from the rotating shaft, has a cylindrical brake drum defining flange 144 formed thereon at its outer margin spaced from and fitting around the outer margin of the plate 120. The member 110 is of reduced dimension at circular part 111 thereof outwardly of the surface thereof which the brake band 126 engages. Part 111 accommodates the movement of the flange 144 in brake-applying direction. A brake band 146 encircles the drum 144 with clearance and carries an internal brake lining 148 which normally is clear or free of the drum 144 but which is moved to frictionally engage the drum 144 to retard rotation thereof relative to the member 120 when the brake-actuating means are operated, which actuating means are similar to those shown in Fig. 1.

In operation, the construction of the brake band 146 to engage the lining 148 with the drum 144 upon the disk member 124 serves to retard rotation of the member 124 relative to the member 120 which is splined upon the shaft (not shown). The relative rotation of the parts 124 and 120 produces an angular displacement thereof disaligning the camming recesses 128 and 130 so that the rollers or spheres 132 serve to separate the disk members 120 and 124 to the extent required to apply friction between the brake linings 122 and 126 and the brake surfaces 112 and 110, respectively.

Upon release of the brake-actuating means, the spring 134 draws the members 120 and 124 together, and the rollers 132 cooperate with the spring to produce relative rotation of the disk members 120 and 124 to restore alignment or registration of the camming recesses 128 and 130, with resultant movement of members 120 and 124 toward each other and release of the linings 122 and 126 from braking engagement with the members 112 and 110. The inward movement of the members 120 and 124 to brake-releasing position centered between surfaces 110 and 112 is guided by the spring pressed anti-friction centering pins 136.

While the preferred embodiments of the invention have been illustrated and described, it will be understood that changes in construction may be made within the scope of the appended claims without departing from the spirit of the invention.

I claim:

1. A disk brake comprising a casing having spaced friction surfaces, a shaft rotatable relative to said casing, a pair of disks, at least one disk being shiftable longitudinally on and splined to said shaft, a friction member carried by each disk and engageable in flat face contact with one of said surfaces, spring means connecting said disks and urging them to positions with said friction members clear of said surfaces, and means for shifting said disks to press said friction members flat against said friction surfaces, said last named means including a member confronting and rotatable relative to one of said disks, normally registering cam recesses in said confronting member and disk, rotatable camming means seated in said recesses, and means selectively engaging the periphery of said last named member to retard rotation thereof relative to said confronting disk.

2. A disk brake as defined in claim 1, wherein said relatively rotatable members constitute said disks.

3. A disk brake as defined in claim 1, wherein said rotation retarding means include a brake band, means to anchor said band relative to said casing, means to constrict and release said brake band, and means for adjusting said brake band in said casing.

4. A disk brake comprising a casing having spaced friction surfaces, a shaft rotatable relative to said casing, a pair of disks, at least one disk being shiftable longitudinally on and splined to said shaft, a friction member carried by each disk and engageable in face contact with one of said surfaces, spring means connecting said disks and urging them to positions with said friction members clear of said surfaces, and means for shifting said discs to press said friction members flat against said friction surfaces, said last named means including a member confronting and rotatable relative to one said disks, normally registering cam recesses in said confronting member and disk, rotatable camming means seated in said recesses, and means for retarding rotation of said confronting member including a brake band carried by said casing and encircling and selectively engageable with the periphery of said confronting member.

5. A disk brake comprising a casing having spaced friction surfaces, a shaft rotatable relative to said casing, a pair of disks, at least one disk being shiftable longitudinally on and splined to said shaft, a friction member carried by each disk and engageable in face contact with one of said surfaces, spring means connecting said disks and urging them to positions with said friction members clear of said surfaces, means for shifting said disks to press said friction members against said friction surfaces, said last named means including a member confronting and rotatable relative to one of said disks, normally registering cam recesses in said confronting member and disk, rotatable camming means seated in said recesses, means selectively engaging the periphery of said last named member to retard rotation thereof relative to said confronting disk, and means for substantially centering said disks between said friction surfaces while released.

6. A disk brake as defined in claim 4, wherein the ends of said brake band are connected by toggle links, actuating means connected to said toggle links, and connectors carried by the ends of said brake band and shiftable relative to said casing in one direction only from a normal brake-releasing position.

7. A disk brake as defined in claim 1, wherein said last named member is interposed between said disks and has cam recesses at opposite faces thereof, each receiving a roller engageable in a cam recess of the adjacent disk.

8. A disk brake comprising a housing having spaced friction surfaces, a shaft rotatable relative to said surfaces, a pair of disks shiftable on and splined to said shaft, a friction member carried by each disk and engageable with one of said surfaces, spring means urging said disks toward each other, a centering member interposed between said disks and rotatable relative to said shaft, means limiting movement of said centering member longitudinally of said shaft, cam means cooperating with said centering member and both disk members and including rotatable members engaging said disk members for spreading said disks upon a differential of rotation between said disks and said centering member, and selectively actuable means for retarding rotation of said centering member relative to said disks.

9. A disk brake as defined in claim 8, wherein said rotation retarding means includes a cylindrical peripheral flange on said centering member and a braking mechanism carried by said housing, and having a brake band encircling and engageable with said cylindrical flange.

10. A disk brake as defined in claim 8, wherein said rotation retarding means includes a brake band encircling and engageable with said centering member, means for constricting said brake band, and means slidably carried by said housing and connected to the ends of said brake band accommodate lost motion of the connection between one end of said brake band and said housing.

11. A disk brake as defined in claim 8, wherein said rotation retarding means includes a brake band encircling and engageable with said centering member, means for constricting said brake band, and means slidably carried by said housing and connected to the ends of said brake band to accommodate lost motion of the end of said brake band relative to said housing, said last named means including means for adjusting the amount of lost motion.

12. A disk brake as defined in claim 8, wherein said rotation retarding means includes a brake band encircling and engageable with said centering member, means for constricting said brake band, and means connecting the ends of said brake band to said housing and slidable on said housing for lost motion in one direction and including an extensible member having a stop engageable with said housing.

13. A disk brake as defined in claim 8, and means for limiting rotation of said centering member relative to said disks.

14. A disk brake as defined in claim 8, and means for positioning said centering member concentrically of said shaft.

15. A disk brake comprising a housing having a braking surface, a rotatable shaft extending into said housing, a pair of registering disks in said housing each having camming surfaces, one disk being splined and slidable on said shaft and the other being rotatable relatively of said shaft, camming means interposed between said disks in engagement with said camming surfaces, resilient means urging said disks together and against said camming means, means for retarding rotation of said relatively rotatable disk, including a brake band encircling said last named disk and means for constricting said band for frictional engagement with said disk, and friction material carried by said splined disk and engageable with said braking surface upon separation of said disks by said camming means upon relative rotation of said disks.

16. A disk brake comprising a housing having spaced friction surfaces, a shaft rotatable relative to said surfaces, a pair of disks shiftable on and splined to said shaft, a friction member carried by each disk and engageable with one of said surfaces, spring means urging said disks toward each other, a centering member interposed between said disks and rotatable relative to said shaft, means limiting movement of said centering member longitudinally of said shaft, cam means cooperating with said centering member and both disk members for spreading said disks upon a differential of rotation between said disks and said centering member, and selectively actuable means for retarding rotation of said centering member relative to said disks, each disk having a plurality of apertures aligned with apertures in the other disk, elongated arcuate slots in said centering member and each registering with a disk aperture, and a plurality of pins slidably mounted in said disk apertures at their ends and passing freely through said slots.

17. A disk brake comprising a casing having spaced friction surfaces, a shaft rotatable relative to said casing, a pair of disks, at least one disk being shiftable longitudinally on and splined to said shaft, a friction member carried by each disk, each friction member being engageable in flat face contact with one of said surfaces, spring means connecting said disks and urging them to positions with said friction members clear of said surfaces, and means for shifting said disks to press said friction members flat against said friction surfaces, said last named means including opposed cam recesses in said disks, camming means seated in said recesses, means forming a cylindrical braking surface located in a plane perpendicular to the planes of said disk and rotatably driven by at least one of said disks, and means selectively engaging the cylindrical braking surface of said last named means to retard rotation thereof relatively to its driving disk to effect camming a part of said disks by said camming means.

18. A brake disk comprising a housing having braking surfaces, a rotatable shaft extending into said housing, a pair of registering disks in said housing each having camming surfaces, one disk being splined and slidable on said shaft, and the other being rotatable relatively to said shaft and to said one disk, camming means interposed between said disks in engagement with said camming surfaces and forming a driving connection between said disks whereby said splined disk produces rotation of said other disk, resilient means urging said disks together and against said camming means, means for retarding rotation of said relatively rotatable disk, said last mentioned means including a brake band encircling said relatively rotatable disk and further including means for constricting said band for frictional engagement with a cylindrical braking surface of said relatively rotatable disk, and friction material carried by the opposite faces of said disks, said friction material being frictionally engaged with the braking surfaces of said housing upon separation of said disks by said camming means upon relative rotation of said disks, said relatively rotatable disk being anchored through said camming means to communicate a part of its reaction of engagement to said splined disk as applying effort acting through said camming means on said splined disk to provide self-energizing braking action.

(References on following page)

References Cited in the file of this patent

UNITED STATES PATENTS

| | | |
|---|---|---|
| 994,332 | Oberhuber | June 6, 1911 |
| 1,673,211 | Staude | June 12, 1928 |
| 1,858,973 | Steele | May 17, 1932 |
| 1,888,643 | Turzicky | Nov. 22, 1932 |
| 2,057,422 | Dickson | Oct. 13, 1936 |
| 2,344,933 | Lambert | Mar. 21, 1944 |
| 2,387,039 | Parrett | Oct. 16, 1945 |
| 2,682,789 | Ochtman | July 6, 1954 |
| 2,857,989 | Burnett et al. | Oct. 28, 1958 |

FOREIGN PATENTS

| | | |
|---|---|---|
| 167,082 | Australia | Feb. 24, 1956 |
| 1,001,380 | France | Feb. 22, 1952 |

OTHER REFERENCES

Publication: Press, German application Serial No. T9837, printed June 28, 1956.